US012040569B2

(12) United States Patent
Markefka

(10) Patent No.: US 12,040,569 B2
(45) Date of Patent: Jul. 16, 2024

(54) SOCKET FOR A COMBINED ELECTRICAL CONNECTION AND DATA CONNECTION

(71) Applicant: Erich Jaeger GmbH + Co. KG, Friedberg (DE)

(72) Inventor: Klaus Markefka, Florstadt (DE)

(73) Assignee: ERICH JAEGER GMBH + CO. KG, Friedberg (DE)

(*) Notice: Subject to any disclaimer, the term of this patent is extended or adjusted under 35 U.S.C. 154(b) by 256 days.

(21) Appl. No.: 16/888,619

(22) Filed: May 29, 2020

(65) Prior Publication Data

US 2021/0013660 A1 Jan. 14, 2021

(30) Foreign Application Priority Data

May 31, 2019 (EP) .................................... 19177592

(51) Int. Cl.

| | |
|---|---|
| ***H01R 13/42*** | (2006.01) |
| ***H01R 13/11*** | (2006.01) |
| ***H01R 13/405*** | (2006.01) |
| ***H01R 13/658*** | (2011.01) |
| ***H01R 13/73*** | (2006.01) |
| *H01R 107/00* | (2006.01) |

(52) U.S. Cl.

CPC ........... *H01R 13/42* (2013.01); *H01R 13/111* (2013.01); *H01R 13/405* (2013.01); *H01R 13/658* (2013.01); *H01R 13/73* (2013.01); *H01R 2107/00* (2013.01); *H01R 2201/26* (2013.01)

(58) Field of Classification Search

CPC .... H01R 13/42; H01R 13/111; H01R 13/405; H01R 13/658; H01R 13/73

USPC .......................................................... 439/660

See application file for complete search history.

(56) References Cited

U.S. PATENT DOCUMENTS

| | | | | |
|---|---|---|---|---|
| 8,535,071 | B1 * | 9/2013 | Mueller | H01R 13/502 439/144 |
| 8,668,506 | B2 * | 3/2014 | Stack | B60L 53/16 439/136 |
| 8,814,589 | B2 * | 8/2014 | Chien | H01R 4/2433 439/393 |
| 9,085,242 | B2 * | 7/2015 | Guillanton | B60L 11/1838 |
| 9,093,788 | B2 * | 7/2015 | Lamb | H01R 13/633 |
| 9,243,436 | B2 * | 1/2016 | Sawada | F16F 1/12 |

(Continued)

FOREIGN PATENT DOCUMENTS

| | | |
|---|---|---|
| WO | WO 2015/112580 | 7/2015 |
| WO | WO 2017/076781 | 5/2017 |

*Primary Examiner* — Alexander Gilman

(74) *Attorney, Agent, or Firm* — LEYDIG, VOIT & MAYER, LTD.

(57) ABSTRACT

Socket for a combined electrical connection and data connection between a motor vehicle and a vehicle component in the external part of the motor vehicle, wherein the socket has a housing with a plug-in opening for connection to a plug of the vehicle component and a cover, a contact carrier with electrical contacts and a data connector mounted in the contact carrier and a connection compartment of the socket for connecting the electrical contacts and the data connector with an electrical grid and a data network of the motor vehicle. The data connector has at least one electrically conductive outer bushing for electrical shielding of the data transmission in the data connector, and a carrier body made from an insulating material and accommodated in the outer bushing the at least one data contact.

20 Claims, 5 Drawing Sheets

(56) References Cited

Figure 3:
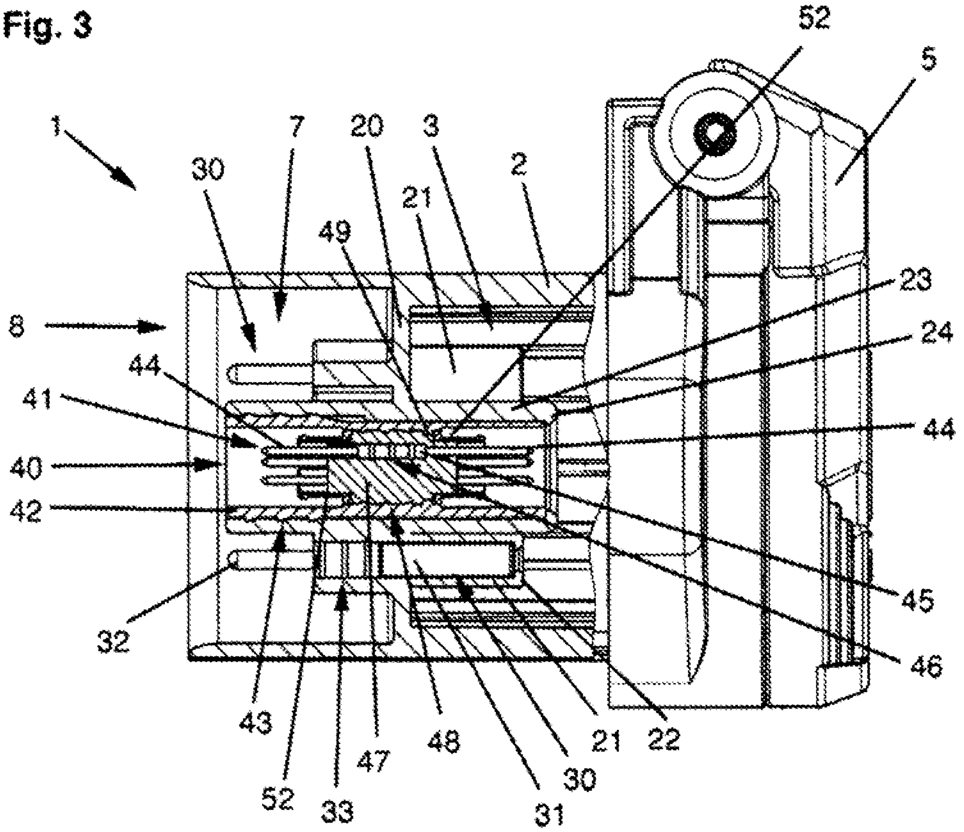

U.S. PATENT DOCUMENTS 9,252,539 B2 * 2/2016 Condo ................. H01R 13/707
9,337,593 B2 * 5/2016 Curtis .................... H01R 13/73
9,819,114 B2 * 11/2017 McCorkle .......... H01R 13/5213
9,819,115 B2 * 11/2017 Markefka .......... H01R 13/5213
9,887,489 B1 * 2/2018 Dietz ................. H01R 13/6275
9,966,713 B1 * 5/2018 Shaeffer ................. H01R 24/86
10,027,072 B1 * 7/2018 Shaeffer ................. H01R 24/76
10,270,187 B2 * 4/2019 Morita ................. H01R 43/005
10,297,951 B2 * 5/2019 Zhao ...................... H01R 13/04
10,424,879 B2 * 9/2019 Vogel ................... H01R 13/642
10,490,937 B1 * 11/2019 Su ...................... H01R 13/6275
10,673,179 B1 * 6/2020 Harris ................ H01R 13/6675
10,886,679 B1 * 1/2021 Hurtado ............. H01R 13/5219
2011/0034053 A1 * 2/2011 Matsumoto .......... H01R 13/639
439/304
2011/0287667 A1 * 11/2011 Ichio .................. H01R 13/4367
439/660
2012/0108097 A1 * 5/2012 Takagi .................... B60L 53/16
439/345
2013/0012054 A1 * 1/2013 Andresen ................ B60L 53/16
439/476.1
2013/0224969 A1 * 8/2013 Sasaki .................... H01R 31/06
439/34
2014/0170889 A1 * 6/2014 Kahara ............. H01R 13/6397
439/352
2015/0111408 A1 * 4/2015 Sasaki ..................... B60L 53/65
439/357
2015/0229055 A1 * 8/2015 Fukushima ............. B60L 53/16
439/733.1
2015/0258905 A1 * 9/2015 Fukushima .......... H01R 13/567
439/34
2015/0343914 A1 * 12/2015 Osawa ............... H01R 13/5227
439/205
2015/0364877 A1 * 12/2015 Osawa ................... H01R 13/42
439/34
2016/0006156 A1 * 1/2016 Shimizu ................. H01R 13/04
439/310

* cited by examiner

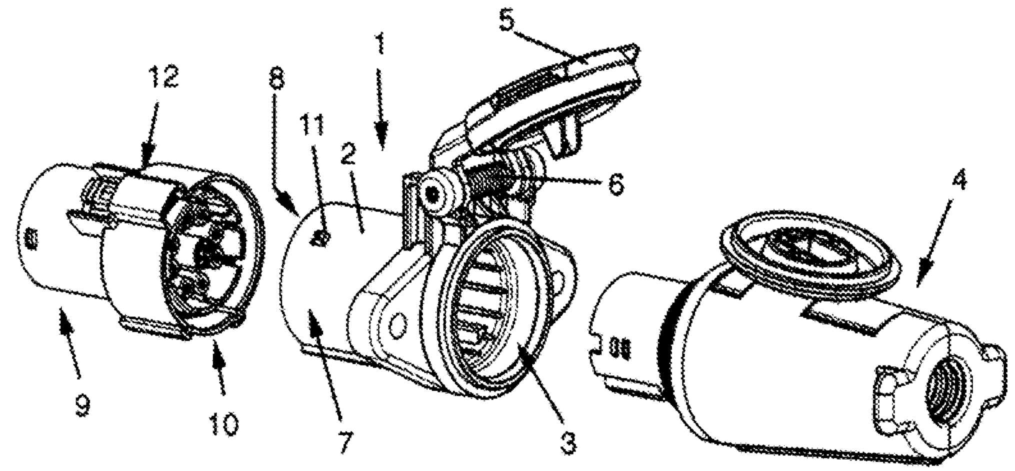
Fig. 1
Fig. 2
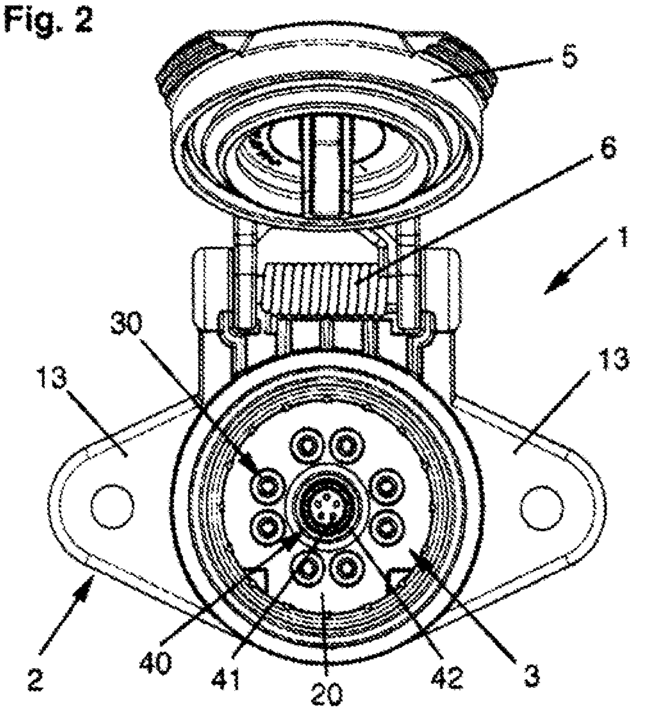

Fig. 4
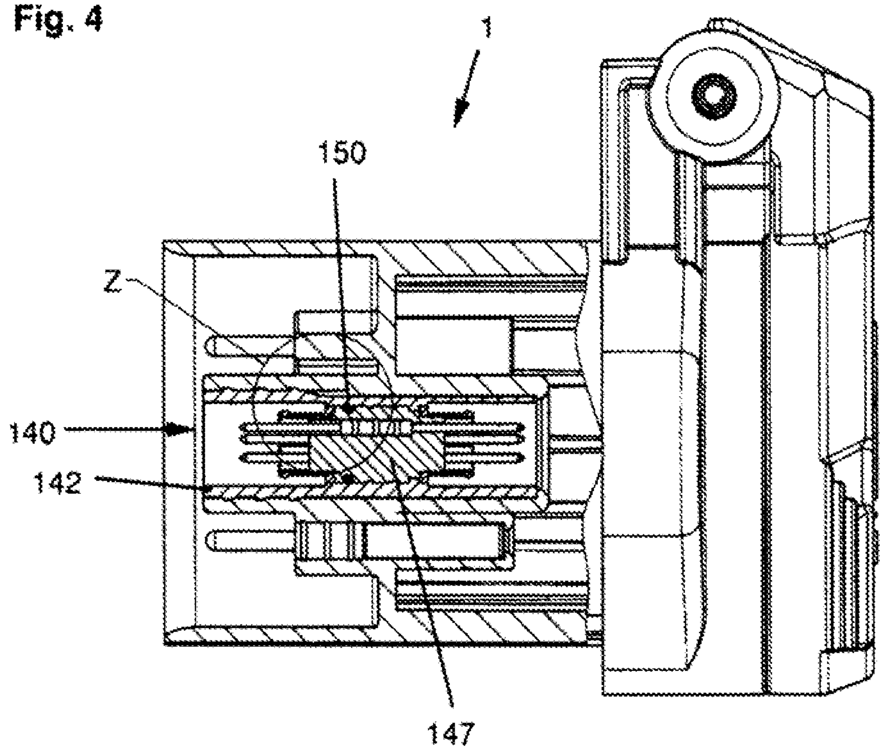
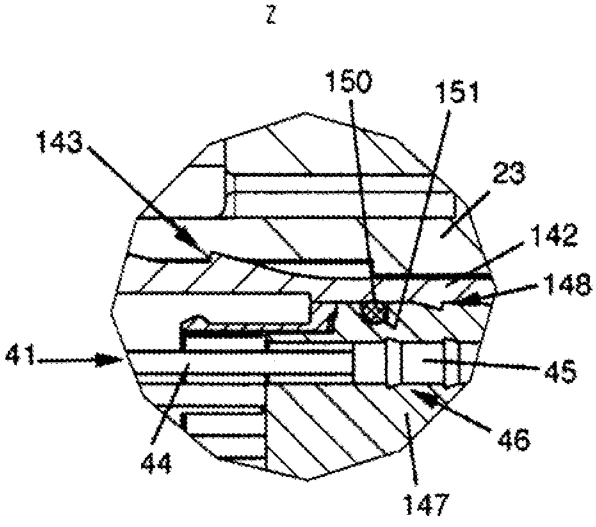
Fig. 5

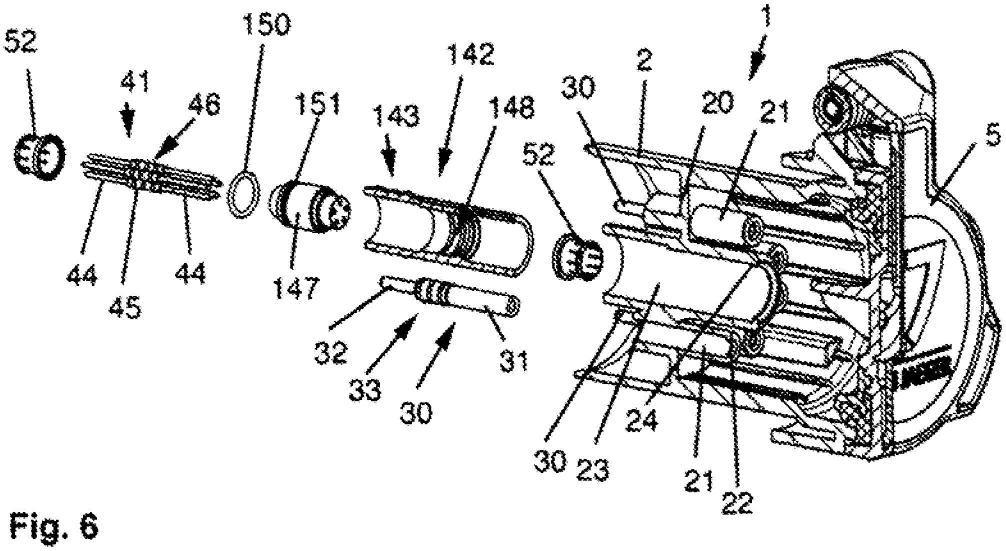
Fig. 6
Fig. 7
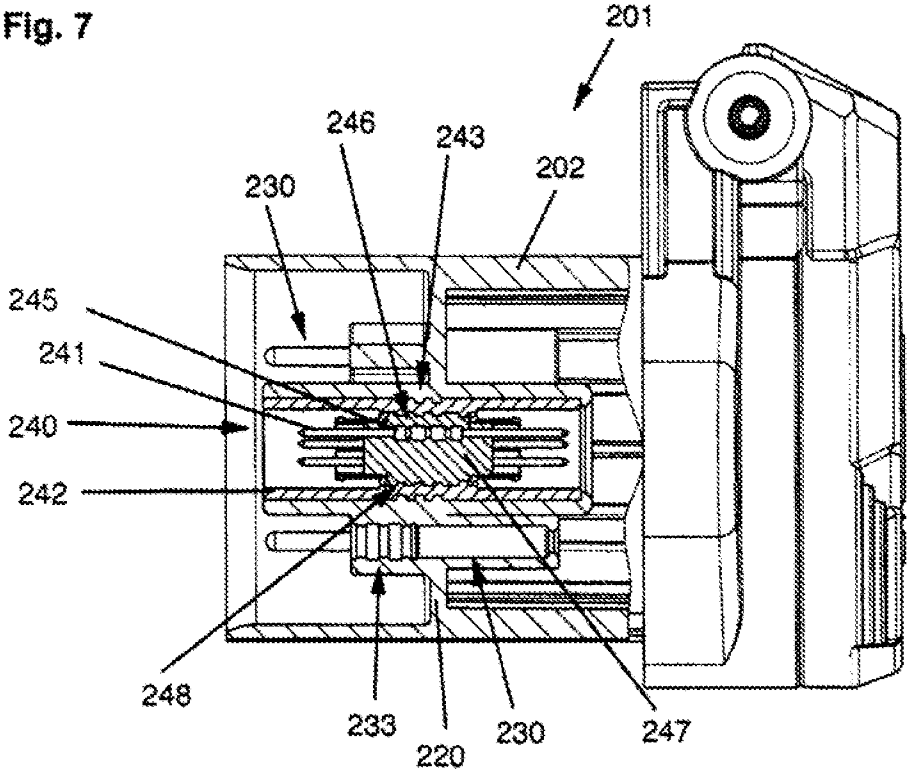

SOCKET FOR A COMBINED ELECTRICAL CONNECTION AND DATA CONNECTION

The invention relates to a socket for a combined electrical connection and data connection between a motor vehicle and a vehicle component, such as a vehicle, trailer or a machine mounted on the vehicle or the like of a passenger car, truck, agricultural vehicle or other utility vehicle. The socket should be suitable for installation in the external part (outside) of the vehicle, which requires a mechanically robust construction that must also be specially sealed. Especially during the transmission of data, effects caused by moisture, e.g. changes in capacity in the area of the contacts, can lead to interference in data communication.

A socket proposed according to the invention has in particular the following components

- a housing with a plug-in opening for connection to a plug of the vehicle component (e.g. a trailer or a machine of a commercial vehicle) and a cover which seals the plug-in opening when not in use, i.e. when no plug of a vehicle component is inserted into the socket;
- a contact carrier with electrical contacts mounted in the contact carrier for an electrical connection (e.g. to supply the vehicle component with a supply voltage) and with a data connector mounted in the contact carrier, wherein the contacts for the electrical connection and the data connector are accessible from the plug-in opening so that an electrical connection or a data connection to a plug of the vehicle component inserted into the plug-in opening can be or is established; and
- a connection compartment of the socket for connecting the electrical contacts and the data connector with an electrical grid and a data network of the motor vehicle, the connection compartment being disposed opposite to the plug-in opening in relation to the contact carrier and referred to as the rear connection compartment.

When integrating a data connector into a mating pattern with conventional contacts, problems often arise with the tightness of the plug and the shielding of the data transmission against electrical interference.

The object of the invention is therefore to create a socket with data contacts and conventional electrical contacts that meets high sealing requirements, enables secure data transmission and allows an easy insertion of the plug into the socket.

This object is solved by a plug with the features of claim 1. For this purpose, in the case of a socket of the above mentioned type, it is provided in particular that the data connector has at least one electrically conductive, in particular metallic, outer bushing for electrical shielding of the data transmission in the data connector, at least one data contact for establishing the data connection, and a carrier body made of an insulating material and accommodated in the (or—in the case of a plurality of outer bushings—each) outer bushing for accommodating the at least one data contact, wherein the data contact or the preferably plurality of data contacts in the carrier body are fixed in a sealing manner in the carrier body by press-fitting or injection moulding/overmoulding and wherein the carrier body is fixed in a sealing manner in the outer bushing by press-fitting or injection moulding. An electrically and magnetically acting shielding is particularly preferred.

According to a particularly preferred embodiment of the invention, a common shielding for all data contacts may be provide, which are all fixed together in the carrier body. The carrier body is reliably sealed in the outer bushing. This avoids the need for several shields to be sealingly mounted in the socket housing for multiple data contacts and the need for each carrier body to be reliably sealed in each shielding. However, there are also applications in which certain data lines and data contacts should be separately shielded from other data lines and data contacts. In this case, individual data contacts or groups of data contacts may, according to the invention, each be surrounded by their own shielding and included into the contact carrier of the socket. The shielding with the enclosed data contacts then acts in principle as an separate shielded data plug, so that interferences of other data transmissions are very reliably shielded. Several such data plugs may then be provided in a socket according to the invention.

In the context of the invention it may be provided that also certain control voltages or control currents are transmitted via the data contacts, for example when a shielded connection is to be provided for an application that requires the transmission of data and control signals. Also a low-voltage supply voltage can be provided according to the invention via data contacts, for example for electronic circuits with low power requirement. It is also possible to transfer the ground attached to the shield additionally via a data contact.

The data contacts in the data connector may, in particular, be pin contacts (male contacts) and/or bushing contacts (female contacts) made of electrically conductive materials, which generate an electrically conductive connection with the respective corresponding counter-contacts. Pin and bushing contacts have particularly large contact surfaces and thus achieve contact resistances as small as possible. This improves the quality of data transmission.

A material with a low dielectric number $\varepsilon_R$ is suitable as insulating material for the carrier body. Examples of suitable materials are:

Polyetheretherketone (PEEK), $\varepsilon_R \approx 3.2$
Teflon, $\varepsilon_R \approx 2.5$
Polyethylene (PE), $\varepsilon_R$ 2.3
High Density Polyethylene (PE-HD)), $\varepsilon_R$ 2.4

Material with a low dielectric number $\varepsilon_R$ in the sense of the invention is in particular a material with a dielectric number of about $\varepsilon_R < 3.5$, preferably of about $\varepsilon_R < 3.0$, and particularly preferably of about $\varepsilon_R \leq 2.5$.

In that, according to the invention, both the at least one data contact is sealingly accommodated and fixed in the carrier body and the carrier body is sealingly accommodated and fixed in the outer bushing, the connection areas of the data plug formed on both sides of the carrier body are reliably sealed. The plug-in opening, which may be exposed to moisture when inserting a plug of the vehicle component, thus does not allow moisture to penetrate into the vehicle's data network through the data connector. The solution proposed according to the invention meets the standards ISO 4019, LV 214, USCAR 2, SAE and combines in a common plug connection the electrical contacts regularly used in the automotive industry for the supply of voltage and power and for direct switching of electrical components (lights, work machines, etc.) with a data transmission that is used for the transmission of sensor information of all kinds, up to images from digital cameras that are to be displayed to the driver and are transmitted via the socket in a data transmission.

According to a preferred embodiment of the invention it may be provided that the electrical contacts and the at least one data contact, and preferably all data contacts of a totality of several data contacts, are formed as axially straight contacts (e.g. pin/male or bushing/female contacts), which extend from the rear connection compartment into the plug-in opening in a straight line. Thus, their ends are directly connected to the vehicle network, e.g. a vehicle-side connector plug, and to the plug of the vehicle component, without a complex geometry in particular of the data contacts and/or an interconnected circuit board impairing the quality of the data transmission.

According to the invention, the proposed socket therefore preferably does not have a circuit board on which the contacts are fixed and if necessary connected by conductor tracks and/or intermediate electronic components, which each extend into the rear connection compartment and the plug-in opening. This enhances a high quality of data transmission.

A particularly preferred embodiment of the proposed socket provides for the outer bushing of the data connector to be accommodated in a sleeve of the contact carrier, which rests on the outer circumference of the outer bushing, i.e. surrounds it with a positive way (form-fitting). It may be provided that the outer bushing extends in its axial direction at least about one third or half of the length of the outer bushing. By placing the outer circumference of the outer bushing against the inner circumference of a sleeve of the contact carrier, the outer bushing can not only be securely fixed in the contact carrier, but a particularly high tightness is also achieved. Preferably, the sleeve extends in the axial direction of the outer bushing over at least three quarters of the length of the outer bushing. In a particularly preferred embodiment, the sleeve extends in the axial direction of the outer bushing over the entire length of the outer bushing. The longer the sleeve, the better the guidance when inserting the plug into the socket.

In a further development of this embodiment it may be provided to have an inwardly protruding collar at the end of the sleeve in the plug-in opening, i.e. a collar which reduces the opening cross-section of the sleeve. This collar allows, for example, to insert the outer bushing of the data connector from the rear connection compartment into the sleeve of the contact carrier until it abuts against the collar. This fixes the outer bushing, or the entire data connector, in a defined position in the contact carrier, In addition, the end of the outer bushing that protrudes into the plug-in opening is protected by the sleeve against mechanical damage. Such damage may make it difficult to insert the plug of the vehicle component, damage the seal due to the force applied and/or affect the quality of the data transmission.

For the electrical contacts, the above description may apply accordingly, i.e. the electrical contacts or a part of them may also be arranged and positioned in corresponding sleeves of the contact carrier. This also applies to the following variants of fixing and sealing, which is again described with respect to the outer shell of the data connector, and can also apply to the electrical contacts in the same or correspondingly similar manner according to the invention.

For fixing and sealing the data connector, an outwardly projecting thorn profile may be formed on the outer circumference of the outer bushing, which thorn profile presses into the inner wall of the contact carrier when the outer bushing is pressed in. This thorn profile has two desired effects according to the invention: On the one hand, the outer bushing is securely fixed by pressing in the thorns of the thorn profile in the sleeve. By compressing the material of the sleeve, it abuts with special pressure on the outer bushing in this area and thus achieves a reliable sealing.

The housing and the contact carrier of the socket are preferably made of a suitable plastic material, e.g. in an injection moulding process, e.g. of polyamide, such as reinforced or unreinforced PA 6 or PA 6.6, polybutylene terephthalate (PBT), polypropylene (PP), polyoxymethylene (POM) or other suitable plastics. Such plastic material is particularly suited for the measures described above. In a preferred embodiment, housing and contact carrier insert are made in one piece in one injection molding step. In this way, additional contact surfaces between housing parts are avoided, which would have to be sealed. The invention can also be used in sockets in which the socket housing and the contact carrier are designed in several parts and the contact carrier is inserted into the housing as an is a sealing manner and is fixed there.

The thorn profile can have several thorns spaced apart in the axial direction at the outer circumference of the outer bushing. A thorn may be formed, for example, by a triangular projection of the outer busing running around the outer circumference. Particularly preferred is a form in which the thorn projects on the side facing to the rear connection compartment exactly or essentially perpendicularly from the outer circumference on the side facing the rear connection compartment, e.g. at an angle of between 80° or 100° or between 85° or 95°, and on the side facing away from the rear connection compartment is again connected to the outer circumference at an angle of less than 80° or larger than 100°. Preferably, angles are less than 45° or larger than 135°. This facilitates the insertion of the outer bushing into the sleeve from the rear connection compartment and makes pushing out in the opposite direction more difficult.

The thorns can also be formed by rectangular protrusions, which protrude symmetrically from the respective wall, preferably right-angled. Such or a similar thorn profile, e.g. made of rectangular grooves, is also suitable if it is overmoulded in an injection moulding process and not inserted into a sleeve. During injection moulding, the injected plastic material wraps itself around the thorn spine profile (or penetrates into the grooves of the thorn profile), ensuring both axial fixation and a reliable sealing.

The thorn profile may have one, two or more thorns (respectively grooves), preferably about one to three.

According to the invention, the outer bushing of the data connector and the sleeve of the contact carrier each preferably have a round cross-section with which a uniform sealing effect can be achieved over the entire outer circumference. The same may also apply to the electrical contacts and the contact carrier sleeves assigned to them.

In an alternative embodiment, the outer bushing of the contact carrier and, if necessary, the electrical contacts can also be directly overmoulded in an injection moulding process when forming the housing of the socket. In this case, too, a thorn profile leads to a better fixing. The direct overmoulding of the outer bushing of the data connector and/or contacts also leads to a high degree of tightness.

According to the invention and in order to achieve the high requirements for the tightness of the socket, especially in the area of the data plug, a sealing seat for the carrier body made of insulation material is also provided in the outer bushing.

According to a preferred embodiment, an inwardly projecting thorn profile can be formed on the inner circumference of the outer bushing for this purpose, which presses itself into the outer wall of the carrier body when the carrier body is pressed into the outer bushing. This also ensures secure fixing and high tightness between the carrier body and the outer bushing.

The thorn profile may have one or more thorns on the inner circumference of the outer bushing spaced apart in the axial direction, preferably about one to three. A thorn may be formed, for example, by a triangular projection of the outer bushing running around the inner circumference. Particularly preferred is a form in which the thorn projects exactly or essentially perpendicularly from the inner circumference on the side facing the rear connection compartment, e.g. at an angle of between 80° or 100° or between 85° or 95°, and on the side facing away from the rear connection compartment it is joined to the inner circumference again at an angle of less than 80° or greater than 100°. Angles smaller than 45° or larger than 135° are preferred. This makes it easier to push the carrier body into the outer bushing from the rear connection compartment and more difficult to push it out in the opposite direction. The thorns can also be formed by rectangular projections, which protrude symmetrically from the respective wall, preferably at right angles.

The outer bushing of the data connector and the carrier body have preferably a round cross-section, with which an uniform sealing effect can be achieved over the entire outer circumference.

Alternatively or additionally, it may be provided that a seal is provided on the outer wall of the carrier body, for example in a sealing groove running around the outer circumference of the outer wall of the carrier body, which seal supports itself in a sealing manner on the inner wall of the outer bushing when the carrier body is received in the outer bushing. According to the invention, such a seal is particularly useful in embodiments in which the carrier body is inserted into the outer bushing by pressing it into place and fixing it there in a sealing manner.

The seal may be formed, for example, by a sealing ring, such as an O-ring seal. A particular advantage of the seal (which is compressed during sealing) is that it is suitable to compensate for different expansion behavior of the outer bushing and the carrier body, which are typically made of different materials, such as metal and an insulating material. For a specified range of application of the socket proposed according to the invention between −40° C. to +85° C., different expansion behavior of the outer bushing and carrier body at certain temperatures can lead to the fact that a sealing reliable in other temperature ranges no longer functions adequately due to size variations. It has been shown that such size fluctuations can be compensated by providing an additional seal (or several additional seals) and that tightness can be reliably achieved.

In such an embodiment it may be advantageous, if several seals, in particular two or three seals, are provided axially spaced from each other on the outer wall of the carrier body. A seal with several sealing lips may also be provided. This provides redundancy during sealing, if a seal or a sealing surface on the inner wall of the outer bushing and/or on the outer wall of the carrier body, e.g. in the groove provided there, has damages, e.g. scratches, affecting the sealing.

According to the invention, a flange-like projection can be provided at the inner wall of the outer bushing, which projection reduces the free inner diameter of the outer bushing in the area of the projection. This projection limits the insertion path of a body inserted into the outer bushing. If, during assembly, the carrier body is inserted into the outer bushing from one side, e.g. from the side facing the rear connection compartment, until the carrier body abuts the projection, its position is defined. When a plug is inserted from the other side, the protrusion limits the insertion path and prevents a force (e.g. one that impairs the sealing effect) from being exerted on the carrier body by moving it in the outer bushing. When inserting the plug, it abuts this flange-like projection and thus prevents a force from being applied on the carrier body.

Instead of inserting and pressing the carrier body into the outer bushing, the carrier body can also be moulded into the outer bushing.

In order to reliably seal the individual data contacts in the data connector, an outwardly projecting thorn profile can be formed at the outer circumference of at least one data contact (or all data contacts) which presses itself into a through-hole of the carrier body when the data contact is pressed into the through-hole. In the manner already described above, a reliable sealing and fixing of the data contact in the carrier body is achieved.

According to a preferred embodiment of the invention, all data contacts provided in the socket are arranged together in a common outer bushing. This is particularly space-saving and allows a large number of electrical contacts and data contacts to be accommodated in the socket. In addition, only one outer bushing needs to be sealed in the contact carrier of the socket. This is easier and cheaper in the production process and reduces the probability of leakage, because leaks can occur at any connecting surface between contact carriers and a connector (e.g. an electrical contact or a data plug). By this measure proposed according to the invention, the number of connecting surfaces is significantly reduced. However, sockets with more than one outer bushing for shielding the data contacts also belong to the subject matter of the invention, as already explained at the beginning.

In socket according to the invention, between two to ten data contacts can preferably be provided. In principle, however, sockets with one data contact in the carrier body surrounded by an outer bushing, similar to a coaxial contact, fall into the subject matter of the invention. The same applies to more than ten data contacts.

For a common bus system for data transmission, two data contacts are sufficient, wherein a data contact (preferably the bus system ground) can optionally also be replaced by the electrically conductive, i.e. metallic, outer bushing. In this case, also one (to the outer bushing) additional data contact is sufficient for a data transfer. In a preferred embodiment for a bus system, two data contacts can be provided. According to the invention, eight data contacts can even be used to realize an Ethernet connection, which usually involves cabling with four twisted pairs of wires. Depending on the requirements, the skilled person can adjust the number of data contacts appropriately, e.g. to surround each of the twisted wire pairs of an Ethernet line with an electrically separate (own) shielding.

In preferred embodiments, approximately two to eight electrical contacts may be provided in the socket, which are arranged around the data connector. In a round mating pattern, i.e. a round or even rotationally symmetrical arrangement of the contacts and the data connector, it is preferably provided that the data connector—possibly with only one outer bushing—is arranged axially with respect to the round mating pattern and the remaining electrical contacts are arranged around the outer bushing(s) of the connector, offset radially outwards. This has the advantage that the data cabling from the socket and the plug can be essentially straight. Knicks in the data lines could possibly impair the transmission quality.

According to the invention, the electrical contacts can be provided to transfer a supply voltage from the motor vehicle to the motor vehicle component. This will often be a DC voltage for which two contacts are used. Currents up to 10A can be permitted via the supply voltage. If higher power is required to operate of e.g. machines or the like systems of the vehicle components, it makes sense to provide electrical contacts for this purpose, which are designed for higher currents, e.g. currents of 25A or 60A.

In order to be able to install the socket easily, it may be provided that the rear connection compartment of the socket has a connection opening into which a vehicle-side connector plug can be inserted for connecting the socket to the vehicle network. This makes it easier to connect the socket to the vehicle network and to replace the socket in the event of a defect. A direct connection of the connecting cables of the on-board wiring harness to contacts in the socket is thus avoided.

Figure 8:
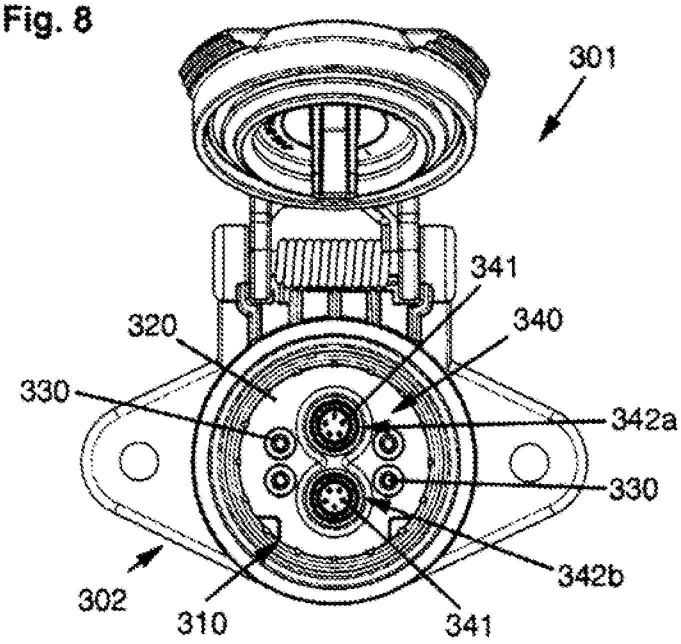

It shows:

FIG. 1 a three-dimensional oblique view of a first embodiment of a socket according to the invention with a vehicle-side connector plug and a plug of the vehicle component, which can be inserted into the socket;

FIG. 2 a view into the plug-in opening of the socket according to FIG. 1 with the cover open;

FIG. 3 a longitudinal section through the socket according to FIG. 1 according to a first invention variant;

FIG. 4 a longitudinal section through the socket according to FIG. 1 according to a second invention variant;

FIG. 5*a* cut-out Z from FIG. 4;

FIG. 6 an exploded view of the socket according to FIG. 4;

FIG. 7 a longitudinal section through the socket according to FIG. 1 according to a third invention variant; and FIG. 8 a view into the plug-in opening of a socket according to a second embodiment of the invention.

FIG. 1 shows a socket according to the invention 1 for a combined electrical connection and data connection between a motor vehicle and, for example, a trailer as a vehicle component. The socket 1 has a housing 2 with a plug-in opening 3, into which a plug 4 of the vehicle component (trailer) can be inserted. A cover 5 is hinged at the housing 2 of the socket 1, which seals the plug-in opening 3 when not in use, whereby the cover 5 is pre-tensioned in the closing direction by means of a spring 6.

A connection compartment 7 with a connection opening 8 is provided in the socket 1 axially opposite the plug-in opening 3. A vehicle-side connector plug 9 can be inserted into the connection opening 8 for connecting the socket 1 to the vehicle network (electrical supply grid and data network). The connection pattern 10 of the connector) 9 is suitably adapted to the arrangement of the contacts—later described in more detail—in the connection compartment 7 of the socket 1. To secure the connector plug 9 to the housing 2, a snap-in protrusion 11 is provided on the housing 2, which interacts with a locking device 12 of the connector plug 9.

FIG. 2 shows a view into the plug-in opening 3 of the housing 2 of the socket 1. Two mounting flanges 13 are formed laterally on the housing 2. The bottom of the plug-in opening 3 is formed by a contact carrier 20, which is provided between the plug-in opening 3 and the connection compartment 7 in the socket 1.

In the contact carrier 20, contacts 30 for an electrical connection and a data connector 40 are fixed. The data connector 40 is arranged axially in the center of the plug-in opening 3 and comprises several, in the shown example five, data contacts 41 and a common outer bushing 42 for electrical shielding of the data transmission in the data connector 40. The electrical contacts 30 for the electrical connection are arranged radially outside of the outer bushing 42, in the illustrated example on a circle provided coaxially with the outer bushing 42. In the example shown here, eight electrical contacts 30 are provided.

The contact carrier 20 with the contacts 30 for the electrical connection and the data connector 40 are described in more detail below with reference to the FIGS. 3 to 7 in various invention variants.

FIG. 3 shows the socket 1 with closed cover 5 and cut housing 2. In the housing 2, the plug-in opening 3 and the connection compartment 7 with the connection opening 8 can be seen, which are separated by the contact carrier 20 from each other and sealed against each other. The contact carrier 20 is manufactured in one piece with the housing 2, for example in an injection moulding process.

The electrical contacts 30 and the data connector 40 are fixed in the contact carrier 20.

The contacts 30 have a bushing section 31 and a pin section 32. The bushing section 31 is accessible from the insert opening 3. The pin section 32 is accessible from the connection compartment 7. At the end of the bushing section 31 facing the pin section 32, a thorn profile 33 is provided, by which the contact 30 is pressed into a sleeve 21 of the contact carrier 20. This securely fixes the electrical contact 30 in the sleeve 21. Because the thorn profile 33 is pressed into the inner wall of the sleeve 21, a reliable seal is achieved in addition to the fixing.

The electrical contact 30 is plugged into the sleeve 21 from the rear end of the socket 1 from the connection compartment 7. At the end of the sleeve 21 facing the plug-in opening 3, the sleeve 21 has a collar 22 which narrows the inner diameter of the sleeve 21 and thus offers a stop for the contact 30 inserted into the sleeve 21.

Similarly, the outer bushing 42 of the data connector 40 is accommodated in a sleeve 23 of the contact carrier 20 for the outer bushing 42. Similar to the sleeve 21, the sleeve 23 also has a collar 24, which protrude inwards at the end of the sleeve 23 located in the plug-in opening 3 and narrows the opening cross-section of the sleeve 23. When inserting the outer bushing 42 of the data connector 40, one end of the outer bushing 42 abuts the collar 24 and thus fixes the data connector 40 or its outer bushing 42 in the intended position.

The outer bushing 42 also has an outwardly protruding thorn profile 43, that engages into the inner wall of the sleeve 23 and flexes the outer bushing 42 in the sleeve 23 in a sealing manner. The outer bushing 42 is also inserted from the rear end of the socket in the connection compartment 7 into the sleeve 23 and thereby pressed sleeve 23.

The data contacts 41 have a pin section 44 at each of their opposite axial ends. One of the pin sections 44 extends into the connection compartment 7. The other of the pin sections 44 extends into the plug-in opening 3. The opposite pin sections 44 of the data contacts 41 are connected by a contact body 45. The contact body 45 has a larger diameter than the pin sections 44. A thorn profile 46 is formed on the contact body 45—comparable to the thorn profile 33 of the electrical contacts 30—, with which the data contacts 41 are held in openings of a carrier body 47 made of insulating material. Similar to the electrical contacts 30, the data contacts 41 are sealingly pressed into and fixed in the carrier body 4 from the rear connection compartment 7 7.

To also fix the carrier body 47 in the outer bushing 42 in a sealing manner, an inwardly protruding thorn profile 48 of the outer bushing 42 is provided—approximately in the axial center of the outer bushing 42—into which the carrier body 47 is inserted. A flange-like projection 49 is formed on the inner wall of the outer bushing 42 as a stop.

Due to the inwardly protruding thorn profile 48 of the outer bushing 42, a reliable sealing can usually be achieved in addition to the fixing. However; due to the different materials of the preferably metallic outer bushing 42 and the carrier body 47 made of insulating material, the press connection between the carrier body 47 and the outer bushing 42 may leak in the event of large temperature fluctuations because the carrier body 47 and the outer bushing 42 may expand differently.

According to a variant of the invention of the socket 1 shown in FIG. 4, therefore, a modified data connector 140 is provided, which is basically constructed as the data connector 40. The unchanged components of the socket and also of the data plug are not described in detail below and are also not marked with reference signs in the drawing.

Between the carrier body 147 of the data connector 140 and its outer bushing 142, a supplementary sealing ring 150 is provided to ensure tightness. Details of the structure of this embodiment of the invention are shown in the cut-out enlargement Z from FIG. 4 in FIG. 5.

FIG. 5 shows the carrier body 147 and the outer bushing 142, which are included in the sleeve 23 of the socket 1. One of the thorns of the inwardly protruding thorn profile 148 of the outer socket 142 are omitted in comparison to the previously described outer socket 42 according to FIG. 3, where the inner wall of the outer bushing 142 is formed smooth and plan. The carrier body 147 has a groove 151, in which the sealing ring 150 is accommodated. After inserting the carrier body 147 into the outer bushing 142, the sealing ring 150 is compressed between the bottom wall of the groove 151 and the inner wall of the outer bushing 142, thus generating an additional sealing effect. Due to the high elasticity of the sealing ring 150, different material expansion coefficients of the carrier body 147 and the outer bushing 142 can be compensated. This reliably improves the sealing effect.

The thorn profiles 46, 143, 148 shown in FIG. 5 show how the individual thorns of the thorn profiles are formed and pressed into the respective surrounding material so that the components held by the thorn profiles 46, 143, 148 are securely and sealingly fixed in the socket.

To illustrate the structure of the socket 1 according to the invention with the data contacts 41 and the data connector 140, FIG. 6 shows an exploded view of the socket 1 with the data connector 140 also shown as an exploded view. Components of the socket housing 2 of the socket 1, the electrical contact 30 and the data contact 41 are identical to the previously described embodiment in FIGS. 1 to 3 and are not described again.

In FIG. 6, further spring sleeves 52 can be seen, which are placed on the two axial ends of the carrier body 147 and rest against the outer bushing 142. These spring sleeves include a shielding of the plugs inserted in the data plug connection 140, so that the shielding is contacted through the socket 1. These spring sleeves 52 are also shown in the section drawing according to fixed point 3.

The parts of socket 1 that are unchanged compared to socket 1, as described in FIGS. 1 to 3, are marked with the original reference signs in FIGS. 4 to 6. Modified parts are marked by reference signs increased by 100.

Socket 201, as described in a further invention variant compared to the previously described versions of socket 1 according to FIGS. 1 to 7, differs by the way of fixing the data connector 240 and the contacts 230 for the electrical connection. In the embodiments described above, the data connector and the contacts for the electrical displacement each were pressed into the sleeves of the contact carrier.

The here described invention variant shows electrical contacts 230 and a data connector 240, which were moulded in during the injection moulding of the housing 202 and the contact carrier 220. For this purpose, instead of a thorn profile with triangular thorns, the electrical contacts 230 have a thorn profile 233 with rectangular, groove-shaped thorns into whose groove-like recesses the injection moulding material is moulded. The outer bushing 242, accordingly, has instead of the outwardly protruding thorn profile with triangular thorns a rectangular thorn profile 243 by means of grooves embedded in the outer wall of the outer bushing 242, which is overmoulded in the same way during injection molding of the housing 202 of the socket 201.

In the example shown in FIG. 7, the data connector 240 itself has also been made by moulding the carrier body 247 into the outer bushing 242. For this purpose, the data contacts 241 have a contact body 245 with a thorn profile 246, which is formed by rectangular grooves embedded into the contact body 245. A rectangular-shaped thorn profile 248 protrudes inwards from the inner wall of the outer bushing 242, so that the carrier body 247 made of insulating material can be moulded into the outer bushing 242.

Both versions, the electrical contacts 230 moulded into the carrier body 220 and the outer bushing 242 of the data connector 240 moulded into the carrier body 220 and/or the carrier body 247 moulded into the outer bushing 242, can also be combined with the other embodiments described above.

FIG. 8 shows a further embodiment of a socket 301 according to the invention, whose design and construction basically corresponds to the previously described embodiments. A detailed description is therefore not required; the above explanations apply accordingly.

The socket 301 differs from the previously described sockets, as in particular from a comparison with FIG. 2, through the mating pattern. This socket 301 has only four contacts 330 for an electrical connection and a data connector 340, which includes a first outer socket 342*a* and a second outer socket 342*b*, each of which are included separately in the carrier body 320 of the housing 302 of the socket 301.

In each of the outer bushings 342*a*, 342*b*, five data contacts 4 are accommodated.

The number of external bushings, data contacts in each outer bushing and/or contacts for the electrical connection can be varied in any embodiment suitable by the skilled person.

LIST OF REFERENCE SIGNS

1 socket
2 housing
3 plug-in opening
4 plugs of a vehicle component
5 cover
6 spring
7 connection compartment
8 connection opening
9 connector plug
10 connection pattern of the connector plug
11 snap-in projection
12 locking device
13 mounting flanges
20 contact carrier
21 sleeve for electrical contact
22 collar of the sleeve for electrical contact
23 sleeve for the outer bushing
24 collar the of sleeve for the outer bushing
30 contact for electrical connection
31 bushing section
32 pin section

33 thorn profile
40 data connector
41 data contact
42 outer bushing
43 outwardly protruding thorn profile of the outer bushing
44 pin section
45 contact body
46 thorn profile of the contact body
47 carrier body of insulating material
48 inwardly protruding thorn profile of the outer bushing
49 flange-like projection
52 spring sleeves
140 data connector
142 outer bushing
143 outwardly protruding thorn profile of outer bushing
147 carrier body made of insulating material
148 inwardly protruding thorn profile of the outer bushing
150 additional sealing ring
151 groove
201 socket
202 housing
220 contact carrier
230 contact for electrical connection
240 data connector
202 housing
220 carrier body
230 contact for electrical connection
233 thorn profile
240 data connector
241 data contact
242 outer bushing
245 contact body
246 thorn profile of the contact body
247 carrier body made of insulating material
248 inwardly protruding thorn profile of the outer bushing
301 socket
320 contact carrier
330 contact for electrical connection
340 data connector
341 data contact
342*a* first outer bushing
342*b* second outer bushing

The invention claimed is:

1. Socket for a combined electrical connection and data connection between a motor vehicle and a vehicle component in the external part of the motor vehicle, the socket comprising:

a housing with a plug-in opening for connection to a plug of the vehicle component and a cover that seals the plug-in opening when not in use, a contact carrier with electrical contacts mounted in the contact carrier for an electrical connection and with a data connector mounted in the contact carrier, a connection compartment of the socket for connecting the electrical contacts and the data connector with an electrical grid and a data network of the motor vehicle, and wherein the data connector has at least one electrically conductive outer bushing for electrical shielding of the data transmission in the data connector, at least one data contact to establish the data connection, and a carrier body made of an insulating material and accommodated in the outer bushing for carrying the at least one data contact wherein the at least one data contact is sealingly fixed in the carrier body by press-fitting or overmoulding and wherein the carrier body is sealingly fixed in the outer bushing by press-fitting or injection moulding.

2. Socket according to claim 1, wherein the electrical contacts and the at least one data contact are formed as axially straight contacts extending from the rear connection compartment to the plug-in opening in a straight line.

3. Socket according to claim 1, wherein the outer bushing of the data connector is housed in a sleeve of the contact carrier, which sleeve rests on the outer circumference of the outer bushing and extends in the axial direction of the outer bushing at least one third of the length of the outer bushing.

4. Socket according to claim 3, wherein on the outer circumference of the outer bushing an outwardly projecting thorn profile is formed which presses into the inner wall of the sleeve of the contact carrier when the outer bushing is pressed in.

5. Socket according to claim 1, wherein on the inner circumference of the outer bushing an inwardly projecting thorn profile is formed which presses into the outer wall of the carrier body when the carrier body is pressed into the outer bushing.

6. Socket according to claim 1, wherein a seal is provided at the outer wall of the carrier body, which seal is supporting itself in a sealing manner on the inner wall of the outer bushing when the carrier body is received in the outer bushing.

7. Socket according to claim 6, wherein a plurality of seals are provided on the outer wall of the carrier body at an axial distance from one another.

8. Socket according to claim 1, wherein a flange-like projection is provided on the inner wall of the outer bushing, which reduces the free inner diameter of the outer bushing in the region of the protrusion.

9. Socket according to claim 1, wherein an outwardly projecting thorn profile is formed on the outer circumference of the at least one data contact, which thorn profile presses into an inner wall of a through-hole of the carrier body when the data contact is pressed into the through-hole.

10. Socket according to claim 1, wherein all data contacts provided in the socket are arranged together in one common outer bushing.

11. Socket according to claim 1, wherein two to eight data contacts are provided in the socket.

12. Socket according to claim 1, wherein two to eight electrical contacts are provided, which are arranged around the data connector in the socket.

13. Socket according to claim 1, wherein the rear connection compartment of the socket has a connection opening into which a vehicle-side connector plug can be inserted for connecting the socket to the vehicle network.

14. Socket according to claim 2, wherein the outer bushing of the data connector is housed in a sleeve of the contact carrier, which sleeve rests on the outer circumference of the outer bushing and extends in the axial direction of the outer bushing at least one third of the length of the outer bushing.

15. Socket according to claim 14, wherein on the outer circumference of the outer bushing an outwardly projecting thorn profile is formed which presses into the inner wall of the sleeve of the contact carrier when the outer bushing is pressed in.

16. Socket according to claim 15, wherein on the inner circumference of the outer bushing an inwardly projecting thorn profile is formed which presses into the outer wall of the carrier body when the carrier body is pressed into the outer bushing.

17. Socket according to claim 16, wherein a seal is provided at the outer wall of the carrier body, which seal is supporting itself in a sealing manner on the inner wall of the outer bushing when the carrier body is received in the outer bushing.

18. Socket according to claim 17, wherein a plurality of seals are provided on the outer wall of the carrier body at an axial distance from one another.

19. Socket according to claim 18, wherein a flange-like projection is provided on the inner wall of the outer bushing, which reduces the free inner diameter of the outer bushing in the region of the protrusion.

20. Socket according to claim 19, wherein an outwardly projecting thorn profile is formed on the outer circumference of the at least one data contact which thorn profile presses into an inner wall of a through-hole of the carrier body when the data contact is pressed into the through-hole.

* * * * *